United States Patent
Schmitz

(10) Patent No.: US 8,191,960 B2
(45) Date of Patent: Jun. 5, 2012

(54) VEHICLE BODY PANELS

(75) Inventor: Andreas Schmitz, Helfenbrunn (DE)

(73) Assignee: AGCO GmbH, Marktoberdorf (DE)

( * ) Notice: Subject to any disclaimer, the term of this patent is extended or adjusted under 35 U.S.C. 154(b) by 199 days.

(21) Appl. No.: 12/693,945

(22) Filed: Jan. 26, 2010

(65) Prior Publication Data
US 2010/0187861 A1 Jul. 29, 2010

(30) Foreign Application Priority Data
Jan. 29, 2009 (GB) .................................. 0901431.7

(51) Int. Cl.
*B62D 25/00* (2006.01)
*B62D 25/12* (2006.01)

(52) U.S. Cl. ................. 296/191; 296/193.11; 296/193.1; 185/69.21

(58) Field of Classification Search ............... 296/181.1, 296/190.11, 29, 191, 193.1, 193.11; 180/89.17, 180/69.2, 69.21
See application file for complete search history.

(56) References Cited

U.S. PATENT DOCUMENTS

| | | | | |
|---|---|---|---|---|
| 4,850,444 A | * | 7/1989 | Bojanowski et al. ........ 180/68.1 |
| 5,141,282 A | * | 8/1992 | Fujiwara .................... 296/193.1 |
| 5,950,753 A | * | 9/1999 | Muldoon et al. ............. 180/68.1 |
| 6,848,524 B2 | * | 2/2005 | Vaillancourt et al. ........ 180/68.1 |
| 7,581,607 B2 | * | 9/2009 | Moen et al. .................. 180/68.6 |
| 7,686,113 B2 | * | 3/2010 | Ayabe .......................... 180/69.2 |
| 7,896,409 B2 | * | 3/2011 | Abdelnour et al. ........... 293/115 |
| 2006/0201727 A1 | | 9/2006 | Chan | |
| 2010/0147613 A1 | * | 6/2010 | Jansen et al. ................. 180/69.2 |
| 2011/0204680 A1 | * | 8/2011 | Fortin ........................ 296/193.1 |

FOREIGN PATENT DOCUMENTS
FR 2710009 A1 3/1995
GB 2036660 A 7/1980

* cited by examiner

*Primary Examiner* — Jason S Morrow

(57) ABSTRACT

A vehicle body part (60) has a perforated grid portion (61) secured in an aperture in a non-perforated portion (601,602), an edge portion of the grid portion defining part of the edge of the body part. A support member (8) extends along the edge portion of the grid portion (60) and supported from the non-perforated portion (601,602), and a seal (9) for contact with an adjacent body part extends around at least said part of the edge of the body part. The seal has a cross-section which includes a first lobe (9c) which covers the edge portion of the grid (61) to protect a vehicle operator from injury by this edge portion and improving styling. The seal cross-section also has a second lobe (9d) which extends between the grid (61) and the support member (8) to prevent vibration of the grid and damage of the paint finish of these components. The seal cross-section also includes a U-shaped channel portion (9a) which encloses the edge of the support member (8).

9 Claims, 7 Drawing Sheets

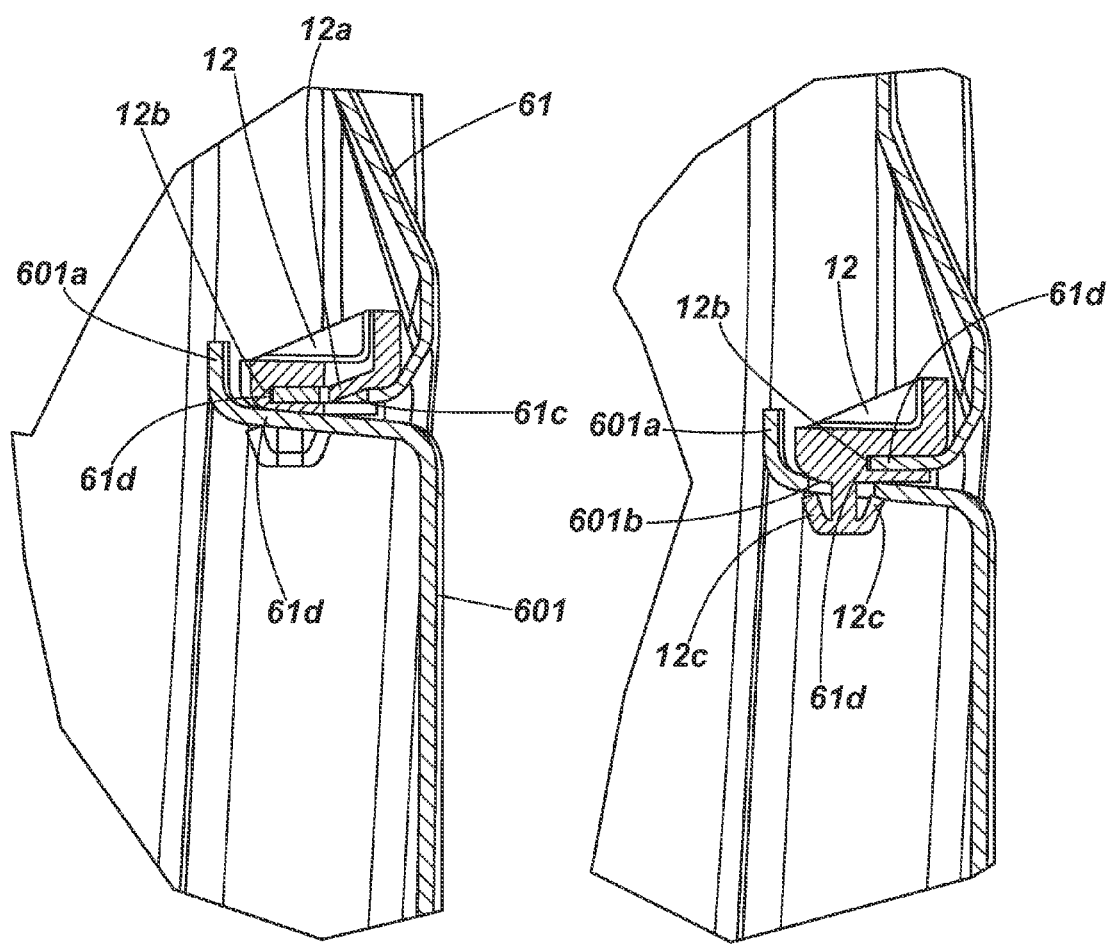
*Fig. 7*  *Fig. 8*

VEHICLE BODY PANELS

CROSS-REFERENCE TO RELATED APPLICATION

The present application claims the benefit of and priority from Great Britain Application No. 0901431.7, filed Jan. 29, 2009, the entire disclosure of which is hereby incorporated by reference.

FIELD OF THE INVENTION

The invention relates to vehicle body panels and particularly, through not exclusively to a motor bonnet assembly for vehicles, especially agricultural vehicles like tractors, which are equipped with perforated grids for air intake to the cooling system.

BACKGROUND

Bonnets serve multiple purposes in modem vehicles. First of all, the non-perforated parts of a bonnet separate the inner engine bay from the environment to avoid unwanted dust or debris entering and also to guide the air inside the engine bay via the grids. Therefore, the bonnet must be partly sealed against the surrounding parts of the vehicle chassis, especially in the area between air entry grids and the cooling package to force the entering air to pass through the grids for filtering reasons.

Concerning the cooling system, the perforated grids integrated in the bonnet provide the air intake to the heat exchangers and serve as a sieve to retain debris exceeding a several size from soiling the heat exchangers of the cooling system which results in decreased cooling performance or damage to the cooling fan.

In addition to this, as styling requirements are concerned, the design of the motor bonnet has a major impact on the overall styling of a vehicle, especially where tractors are concerned.

It is well known to affix perforated grids to the bonnet. These grids are made of flat steel plates in which closely positioned apertures are stamped. These apertures may be of holohedral form being of round or hexagonal or other shapes of about 1-2 mm diameter and 0.5-2 mm distance apart. Afterwards, these plane grids are cut to the required outer shape and are pressed or deep-drawn to obtain a three-dimensional shape needed for stiffness and installation.

Due to the fact that the apertures are holohedral and the outer geometry is cut before the three-dimensional forming process, the edges of these grids are shaped like a saw which can easily injure operator and the outer geometry can be corrugated, which must be seen negative from the styling point of view. These corrugations are caused by varying flow characteristics of the material during deformation.

As an alternative, the perforation is not holohedral by providing a un-perforated area around the outer periphery of the grid. This requires the apertures in the flat steel plate to be stamped in a manner dependent on the required shape of the grind which is much more expensive to produce, reduces intake surface and does not prevent corrugations on the edges.

As an alternative, the outer shape could be finished after forming the grid. This requires an additional cycle in production increasing costs.

As an alternative, grids are covered with rubber material. This requires a thicker coating which reduces the size of the apertures which weakens the structure if the apertures are increased in size to offset the thicker coating. These rubber coatings are also more expensive than thin galvanic powder coatings or dip coatings, which are normally used for corrosion protection.

Due to this, these grids are mainly assembled to the inner side of the bonnet to cover the sharp and corrugated edges of the grid. This type of the assembly is sometimes prohibited by the shape of the mating contours. For example, the receiving part could be u-shaped with limbs reducing their distance towards the end. Therefore, especially for complex three-dimensional forming, the inserted part cannot be positioned inside or only by damaging the painting.

Concerning the assembly of grids to the bonnet an additional aspect must be considered. The stamping procedure produces apertures with little rims extending from the grid surface. In combination with the sharp edges of the outer shape of the grid, this increases the danger that the painting of the part which is to receive the grid is damaged when contacted by the grid. Even when good contact is provided, the lower stiffness of the grid causes movement relative to the stiffer receiving part due to vibration. This type of damage may be avoided by screwing the parts together in the contact areas. Circumferential screwing does increase the assembly efforts and increase the requirements on shape and position tolerances thus increasing manufacturing costs.

To overcome this problem, grids are positioned into the receiving parts by using adhesive and sealing means which must be applied manually and carefully and hardened afterwards during assembly thus increasing assembly time.

In general overlapping contours reduce the perforated surface of a grid and thereby reducing air intake surface. Thereby air intake capacity is reduced or higher air speed must be accepted which is increasing pressure drops and debris suction.

SUMMARY

It is an object of the present invention to provide a motor bonnet assembly which mitigates the above mentioned problems.

Thus according to the present invention there is provided a vehicle body part having a perforated grid portion secured in an aperture in a non-perforated portion, an edge portion of the grid portion defining part of the edge of the body part, a support member extending along said edge portion of the grid portion and supported from the non-perforated portion and a seal for contact with an adjacent body part extending around at least said part of the edge of the body part, the seal having a cross-section which includes a first lobe which covers said edge portion of the grid to protect a vehicle operator from injury by this edge portion and improve styling.

The seal may have a cross-section with second lobe which extends between the grid and the support member to prevent vibration of the grid and damage of the paint finish of these components.

The seal cross-section may include a U-shaped channel portion which encloses the edge of the support member. The support member may conveniently comprise a bracket which is secured across an open end of the aperture.

The invention also provides a vehicle body part having a perforated grid portion secured in an aperture in a non-perforated portion, the perforated grid portion being secured to the non-perforated portion by a series of plastic clips which each have a first formation which engages a first locating formation adjacent the periphery of the aperture, a second formation which engages a second locating formation adjacent a peripheral portion of the grid, and a third separating portion which extends between the grid and the non-perforated portion of the body part when the grid is secured to the non-perforated portion by the clip.

The first formation on each clip may comprise one or more resilient lugs which snap into respective formations adjacent the periphery of the aperture. In addition to this, the clearance (distance) between the grid and receiving part is kept constant to improve styling. Moreover, the assembly time and costs are reduced.

The second formation on each clip may comprise one or more resilient projections which snap into respective formations in a peripheral portion of the grid.

Using the above constructions the painting of bonnet parts is protected and the sharp outer edges of the grid can be hidden.

BRIEF DESCRIPTION OF THE DRAWINGS

The present invention will now be described, by way of example only, with reference to the accompanying drawing in which:

FIG. 7 shows the section A-A of the motor bonnet assembly of FIG. 4.

FIG. 8 shows the section B-B of the motor bonnet assembly of FIG. 4.

DESCRIPTION OF EXAMPLE EMBODIMENTS

Figure 1:
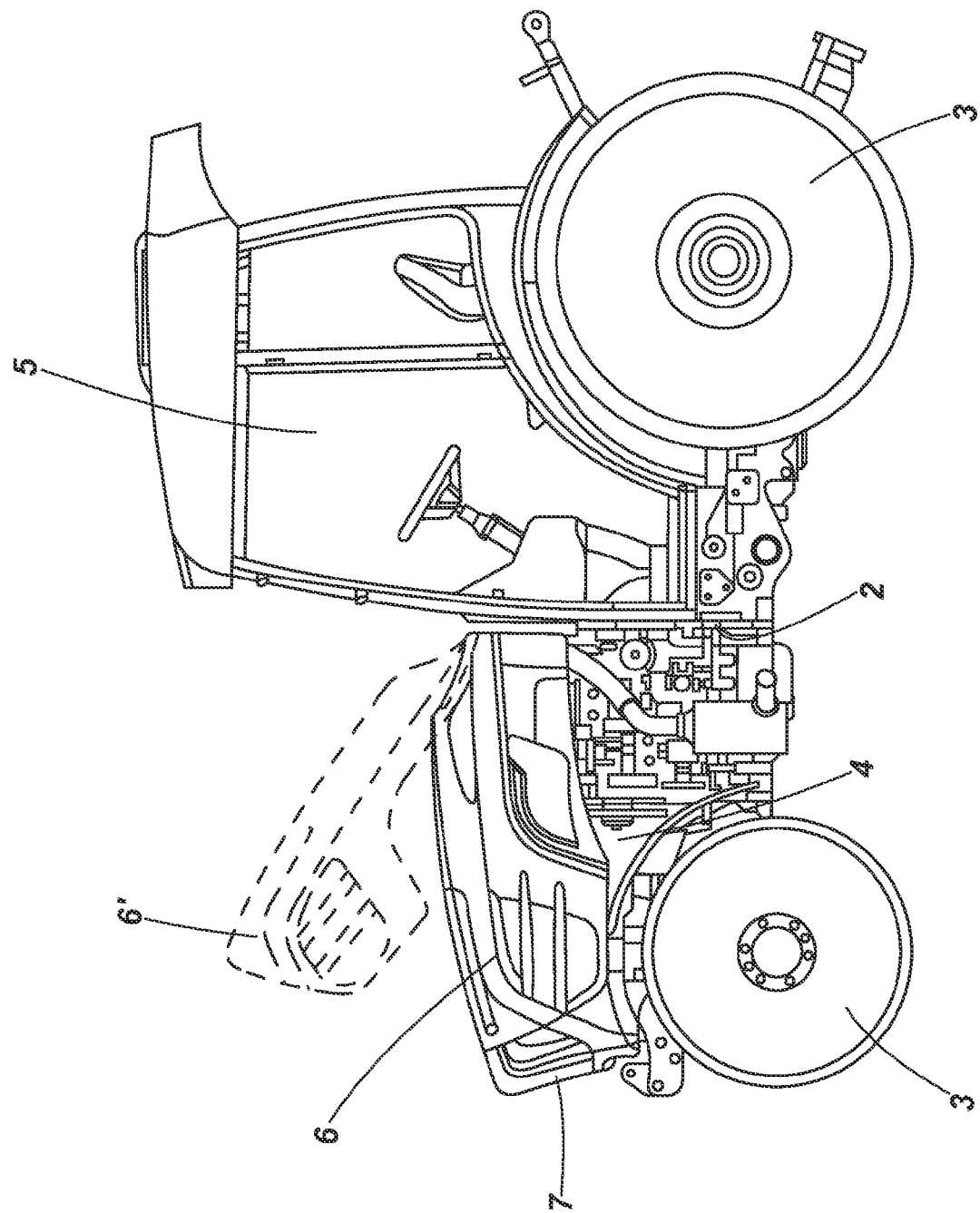
FIG. 1 shows an overall side view of a vehicle, especially a tractor.

FIG. 1 shows a tractor 1 comprising a chassis 2, wheels 3, an engine bay 4, a driver cab 5, a bonnet assembly 6 and a fuel tank 7. The fuel tank 7 is also partly providing the outer contour of the front area. The bonnet 6 is also shown in its opened position 6' by dashed lines.

Figure 2:
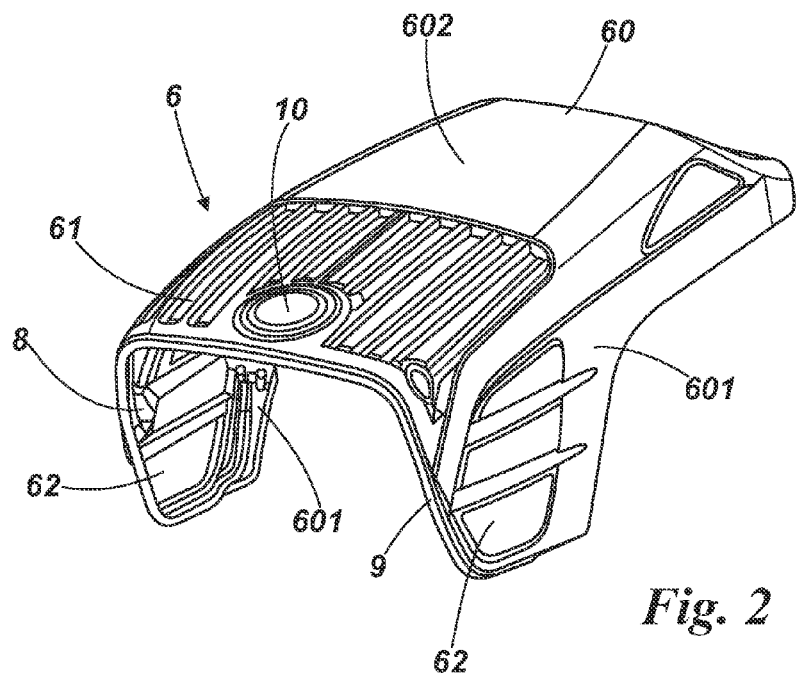
FIG. 2 shows a perspective view of a motor bonnet.
Figure 3:
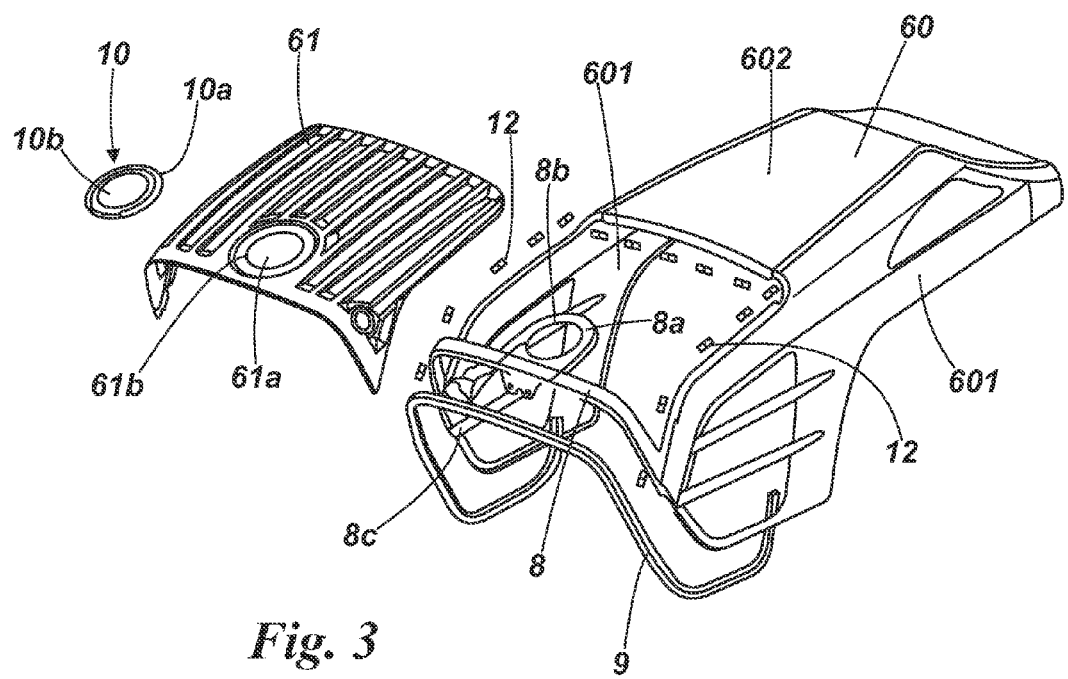
FIG. 3 shows an exploited view of a motor bonnet of FIG. 2.

FIGS. 2 and 3 shows the bonnet assembly 6, which mainly consists of an un-perforated bonnet body 60, a top grid 61 and two side grids 62. All grids 61, 62 are holohedral perforated to gain maximum air intake surface. The bonnet body 60 is consisting of two symmetrical side panels 601 and a top panel 602 which are welded or glued together. The bonnet body 60 is painted in a different colour compared to the grids 61,62 for styling reasons. In the front area of the bonnet assembly 6, an u-shaped bracket 8 is screwed to the bonnet body 60 to increase stiffness of the bonnet assembly 6. A sealing 9 is provided which is fixed to the bonnet body 60 and the bracket 8. The bonnet assembly 6 is provided with a fuel filler cover 10, which consists of fixation ring 10a and a pivotable cover 10b to access to the fuel tank filler neck cap 70 shown in FIG. 4.

Figure 4:
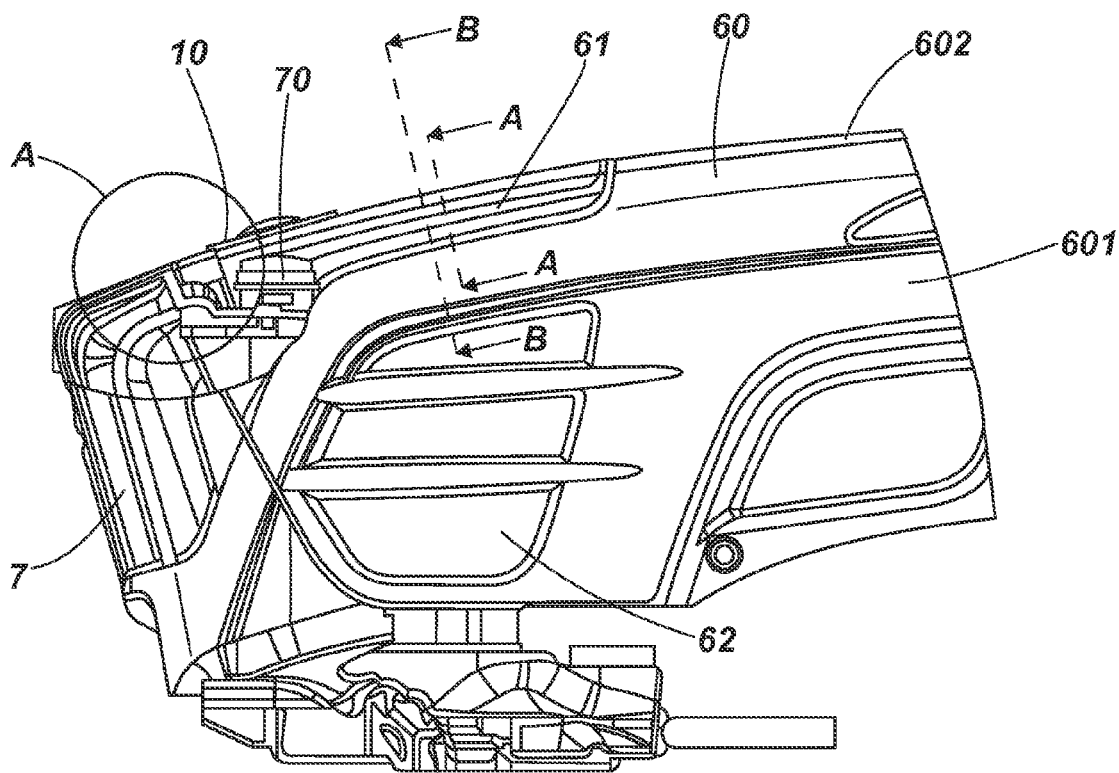
FIG. 4 shows a detailed side view with partial vertical section.

FIG. 4 shows the sideview with a partly vertical section through the symmetry axis of the vehicle with the bonnet assembly 6, especially of the sealing 9. The fuel tank filler neck 70 can be accessed by opening pivotable cover 10b of the fuel filler cover 10.

Figure 5:
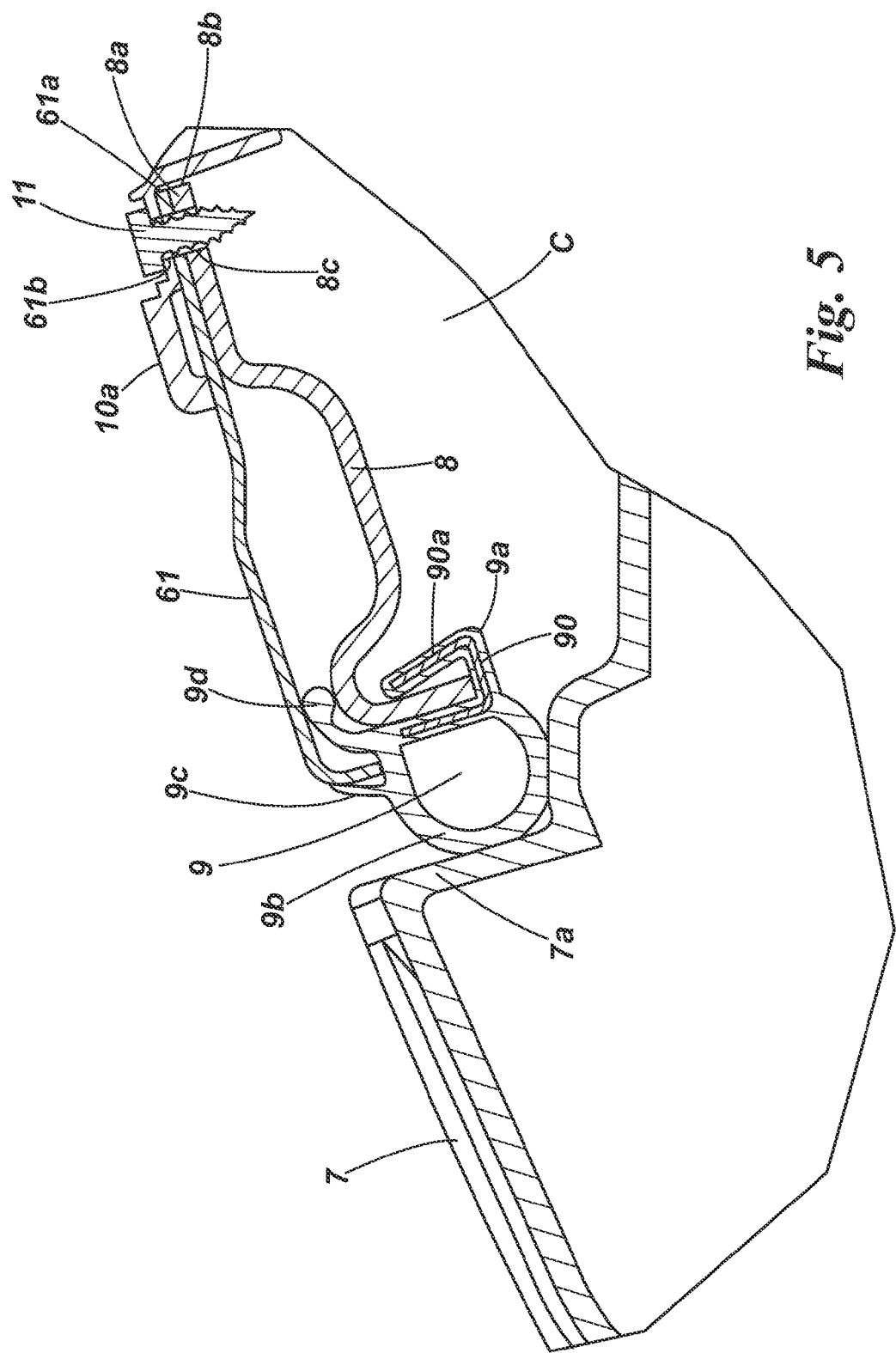
FIG. 5 shows enlarged detail A of FIG. 4.

FIG. 5 shows detail A of the section shown in FIG. 4. The top grid 61 is fixed to the bracket 8 together with the fixation ring 10a of the fuel filler cover 10 by screws 11. Therefore, the bracket is provided with an extension 8a which includes an aperture 8b and circumferential bores 8c in which the screws 11 are attached to mount the fuel filler cover 10 thereto. Coaxially to the aperture 8b and bores 8c in the extension an aperture 61a and bores 61b are provided in the top grid 61 for fixation as shown in FIG. 3.

The sealing 9 is fixed to the bracket 8 by the clamping contour 9a having an u-shaped steel core 90 whose limbs 90a fix the clamping contour 9a to the bracket 8.

In the front area the sealing 9 has a hollow contour 9b which contacts the surface 7a of the fuel tank 7 to close the gap between motor bonnet assembly 6 and fuel tank 7 needed for movement of the bonnet 6 and overcoming tolerances. Thereby, no air can bypass the top grid 61 and its sieve function through this gap so the intake of dust and debris is avoided.

In addition to this well known sealing design, an additional protection contour 9c is provided which is covering the sharp outer edges of the top grid 61 to avoid operator injury when touching this area, e.g. when closing/opening the bonnet 6.

A further support contour 9d is provided which is placed between top grid 61 and bracket 8 to avoid direct contact which may cause painting damage and rattling. In addition to this, the position of the top grid 61 is defined properly to improve styling. On the other hand, the compact support contour 9d is very small so the surface used to take air into the cooling area C inside the bonnet assembly 6 is enlarged. Air can pass the top grid 61 and then enter area C through apertures and beadings in the bracket 8 (not shown).

Figure 6:
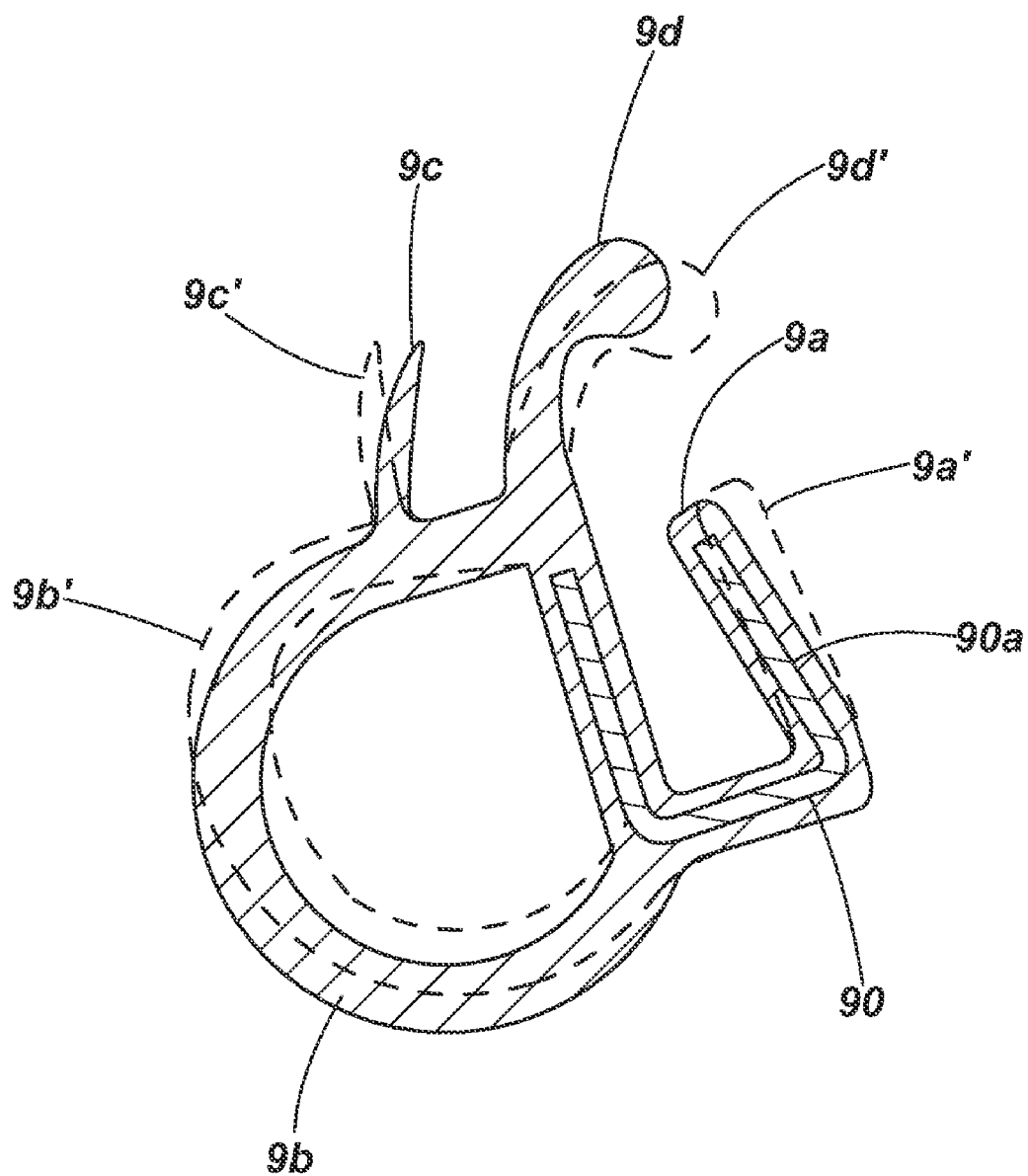
FIG. 6 shows the section of a sealing according the present invention.
Figure 9A:
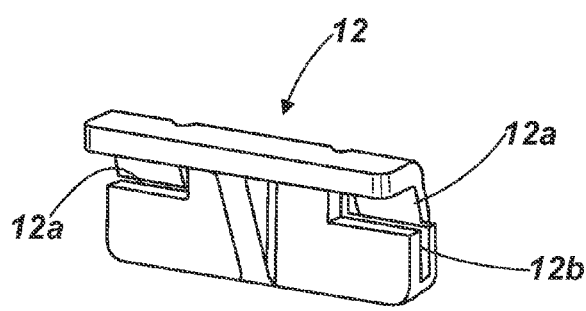
FIG. 9a,b show two perspective views of a clip according the present invention.
Figure 9C:
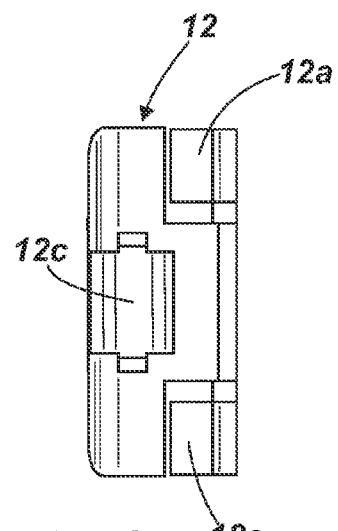
FIG. 9c show bottom view of a clip according the present invention.
Figure 9B:
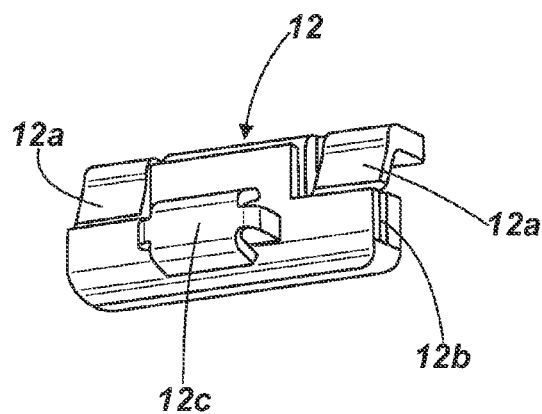
FIG. 9d show front view of a clip according the present invention.
FIG. 9e show top view of a clip according the present invention.
Figure 9D:
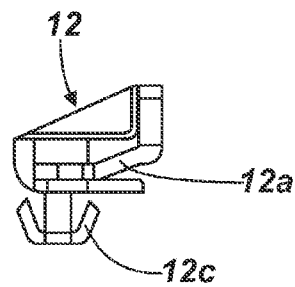
Figure 9E:
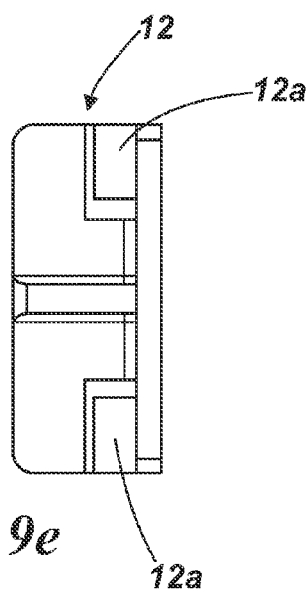

FIG. 6 shows sealing 9 in manufacture conditions and installation condition in dotted lines. The different contours 9a, 9b and 9c and 9d are manufactured in positions differing from installation position 9a', 9b', 9c' and 9d'. Thereby, a initial tension is applied which ensures the proper rest on the contacting parts.

The assembly of the top grid 61 to the bonnet body 60, especially the side panel 601 is shown in FIGS. 7 and 8. The details of the clip 12 manufactured by injection moulding are shown in FIGS. 9a to 9e.

Clips 12 are fixed to the top grid 61 by lugs 12a which extend into apertures 61c in the top grid 61 and a grove 12b which gathers the outer edges 61d of the top grid 61. Thereby safe connection between top grid 61 and clip 12 is provided.

The clip 12 (in connection with the top grid 61) is then fixed to the panel 601. Therefore circumferential, opened crimping 601a is provided with apertures 601b in the side panel 601. The clip 12 is fixed to the side panel 601 by snap in additional lugs 12c which are shaped similar to a fir tree.

Thereby any direct contact between top grid 61 and bonnet body 60 is prohibited, the distance between the two parts is kept constant improving styling and in addition to this, the sharp outer edges 61d are hidden inside the crimping 601a.

As shown in FIG. 3 clips 12 are provided to attach the top grid 61 to bonnet body 60 consisting of side panels 601 and top panel 602.

Moreover, although the above described embodiment includes a grid being fixed to a panel of a bonnet, it is envisaged that the connection described above could be used for any other assembly of two parts, e.g. covers integrated in linings, to avoid painting damage or operator injury caused by sharp edges. In addition, clearance/distance is kept constant circumferentially between the two part and the shabby edges are hidden, which both improve styling.

What is claimed is:

1. A vehicle body part having a perforated grid portion secured in an aperture in a non-perforated portion, an edge portion of the grid portion defining part of the edge of the body part, a support member extending along said edge portion of the grid portion and supported from the non-perforated portion, and a seal for contact with an adjacent part of the vehicle body part extending around at least said part of the edge of the body part, the seal having a cross-section which includes a first lobe which covers said edge portion of the grid to protect a vehicle operator from injury by this edge portion and improving styling.

2. A vehicle body part according to claim 1 in which the seal cross-section has a second lobe which extends between the grid and the support member to prevent vibration of the grid and damage of the paint finish of these components.

3. A vehicle body part according to claim 1 in which the seal cross-section includes a U-shaped channel portion which encloses the edge of the support member.

4. A vehicle body part according to claim 3 in which the U-shaped channel portion includes a U-shaped metal reinforcement.

5. A vehicle body part according to claim 1 in which the support member comprises a bracket secured across an open end of the aperture.

6. A vehicle body part according to claim 1 in which the edges of the grid which do not define the edge of the part are secured to the non-perforated portion by a series of plastics clips which each have first formation which engages a first locating formation adjacent the periphery of the aperture, a second formation which engages a second locating formation adjacent a peripheral portion of the grid, and a third separating portion which extends between the grid and the non-perforated portion of the body part when the grid is secured to the non-perforated portion by the clip.

7. A vehicle body part according to claim 6 in which the first formation on each clip comprises one or more resilient lugs which snap into respective formations adjacent the periphery of the aperture.

8. A vehicle body part according to claim 6 in which the second formation on each clip comprises one or more resilient projections which snap into respective formations in a peripheral portion of the grid.

9. A vehicle body part according to claim 7 in which the respective formations adjacent the peripheral portion of the grid and non-perforated portion are formed in inwardly turned flanges formed on the grid and non-perforated portions.

* * * * *